(12) United States Patent
Yang et al.

(10) Patent No.: US 10,340,100 B1
(45) Date of Patent: Jul. 2, 2019

(54) KEYBOARD DEVICE

(71) Applicant: Primax Electronics Ltd., Taipei (TW)

(72) Inventors: Che-Wei Yang, Taipei (TW); Tien-Yu Yeh, Taipei (TW); Ming-Han Wu, Taipei (TW)

(73) Assignee: PRIMAX ELECTRONICS LTD, Taipei (TW)

( * ) Notice: Subject to any disclaimer, the term of this patent is extended or adjusted under 35 U.S.C. 154(b) by 0 days.

(21) Appl. No.: 16/017,279

(22) Filed: Jun. 25, 2018

(30) Foreign Application Priority Data

Feb. 2, 2018 (TW) .............................. 107103861 A

(51) Int. Cl.
| | |
|---|---|
| *H01H 13/14* | (2006.01) |
| *H01H 13/50* | (2006.01) |
| *G06F 3/02* | (2006.01) |
| *H01H 13/04* | (2006.01) |
| *H01H 13/20* | (2006.01) |
| *H01H 13/70* | (2006.01) |

(52) U.S. Cl.
CPC ........... *H01H 13/50* (2013.01); *G06F 3/0202* (2013.01); *H01H 13/04* (2013.01); *H01H 13/14* (2013.01); *H01H 13/20* (2013.01); *H01H 13/70* (2013.01); *H01H 2233/002* (2013.01); *H01H 2233/07* (2013.01)

(58) Field of Classification Search
CPC .... H01H 13/14; H01H 3/125; H01H 13/7065; H01H 2221/044; H01H 13/705; H01H 2221/036; H01H 13/20; H01H 13/50; H01H 3/12; H01H 13/02; H01H 13/86; H01H 2219/002; H01H 2219/006; H01H 2223/002; H01H 2209/01; H01H 2233/002; H01H 25/041
USPC .................................. 200/5 A, 314, 341–345
See application file for complete search history.

(56) References Cited

U.S. PATENT DOCUMENTS

| | | | | |
|---|---|---|---|---|
| 8,723,062 | B2 * | 5/2014 | Chen .................... | H01H 13/705 200/314 |
| 10,056,207 | B2 * | 8/2018 | Wareham ............. | H01H 13/705 |
| 2010/0051430 | A1 * | 3/2010 | Baller .................. | H01H 25/041 200/314 |
| 2010/0163386 | A1 * | 7/2010 | Sun ........................ | H01H 9/181 200/341 |
| 2013/0098743 | A1 * | 4/2013 | Kuo ....................... | G06F 3/0221 200/5 A |
| 2014/0374231 | A1 * | 12/2014 | Hsu ........................ | H01H 13/14 200/517 |

* cited by examiner

*Primary Examiner* — Ahmed M Saeed
(74) *Attorney, Agent, or Firm* — Kirton McConkie; Evan R. Witt

(57) ABSTRACT

A keyboard device includes a key switch, a base plate, a connecting element and a replaceable key. The replaceable key includes a coupling plate and a keycap. The connecting element is connected between the coupling plate and the base plate. The coupling plate includes a first sliding part. The keycap includes a second sliding part. When the second sliding part is slid relative to the first sliding part, the keycap is combined with the coupling plate or the keycap is detached from the coupling plate. Consequently, the keycap is easily assembled or disassembled. Moreover, since the connecting element is not touched during the process of disassembling the keycap, the connecting element is not damaged.

16 Claims, 10 Drawing Sheets

KEYBOARD DEVICE

FIELD OF THE INVENTION

The present invention relates to an input device, and more particularly to a keyboard device.

BACKGROUND OF THE INVENTION

Generally, the widely-used peripheral input device of a computer system includes for example a mouse device, a keyboard device, a trackball device, or the like. Via the keyboard device, characters or symbols can be inputted into the computer system directly. As a consequence, most users and most manufacturers of input devices pay much attention to the development of keyboard devices.

The structures and the functions of a conventional keyboard device will be illustrated as follows. FIG. 1 is a schematic side view illustrating a conventional keyboard device. For succinctness, only one key 11 and the related components are shown in FIG. 1. It is noted that the number of the keys 11 is not restricted. The conventional keyboard device 1 comprises plural keys 11, a base plate 15 and a membrane circuit board 14. The membrane circuit board 14 is arranged between the key 11 and the base plate 14. Each of the plural keys 11 comprises a keycap 111, a connecting element 12 and an elastic element 13. The connecting element 12 is connected between the keycap 111 and the base plate 15. Consequently, the keycap 111 is movable upwardly or downwardly relative to the base plate 15. The elastic element 13 is arranged between the keycap 111 and the base plate 15. Moreover, the elastic element 13 comprises a contacting part 131.

The connecting element 12 is a scissors-type connecting element. Moreover, the connecting element 12 comprises a first frame 121 and a second frame 122. The second frame 122 is pivotally coupled to the first frame 121. The two ends of the first frame 121 are connected with the keycap 111 and the base plate 15, respectively. The two ends of the second frame 121 are also connected with the keycap 111 and the base plate 15, respectively. Due to the above structure, the first frame 121 and the second frame 122 can be swung relative to each other. Consequently, the first frame 121 and the second frame 122 are switched from a stacked state to an open-scissors state or switched from the open-scissors state to the stacked state.

The membrane circuit board 14 comprises key switches (not shown). While the keycap 111 of any key 11 is depressed and moved downwardly relative to the base plate 15, the first frame 121 and the second frame 122 of the connecting element 12 are switched from the open-scissors state to the stacked state. Moreover, as the keycap 111 is moved downwardly to compress the elastic element 13, the corresponding key switch is pushed and triggered by the contacting part 131 of the elastic element 13. Consequently, the keyboard device 1 generates a corresponding key signal. When the keycap 111 of the key 11 is no longer depressed, the keycap 111 is moved upwardly relative to the base plate 15 in response to an elastic force of the elastic element 13. Meanwhile, the first frame 121 and the second frame 122 are switched from the stacked state to the open-scissors state again, and the keycap 111 is returned to its original position.

With increasing development of science and technology, the functionality of the keyboard device 1 is gradually enhanced and thus the demands of the user on the keyboard device 1 are gradually increased. For example, the keycap 111 of the general keyboard device 1 is made of a plastic material. However, some users prefer to change the style or the material of the keycap 111. For example, the users prefer that some of the keycaps 111 are made of a wood material, a leather material or any other appropriate material. As known, it is difficult for the general users to disassemble the keycaps 111 of the conventional keyboard device 1. During the process of disassembling the keycaps 111, the connecting element 12 or other components are readily suffered from damage.

In other words, the conventional keyboard device needs to be further improved. Therefore, there is a need of providing a keyboard device with easily-changeable keycaps.

SUMMARY OF THE INVENTION

An object of the present invention provides a keyboard device with easily-changeable keycaps.

In accordance with an aspect of the present invention, there is provided a keyboard device. The keyboard device includes a key switch, a base plate, a connecting element and a replaceable key. The connecting element is disposed on the base plate and connected with the base plate. The replaceable key includes a coupling plate and a keycap. The coupling plate is located over the connecting element and connected with the connecting element. The coupling plate includes a first sliding part. When the coupling plate is moved downwardly relative to the base plate, the key switch is triggered. The keycap is exposed outside the keyboard device. The keycap includes a second sliding part. The keycap is combined with the coupling plate and at least a portion of the coupling plate is covered by the keycap when the second sliding part is slid relative to the first sliding part, or the keycap is detached from the coupling plate when the second sliding part is slid relative to the first sliding part.

From the above descriptions, the connecting element of the keyboard device is connected with the base plate and the coupling plate. When the second sliding part is slid relative to the first sliding part, the keycap is combined with the coupling plate or the keycap is detached from the coupling plate. In comparison with the conventional technology, the connecting element of the present keyboard device is not connected with the keycap. Since the connecting element is not touched during the process of disassembling the keycap, the connecting element is not damaged. Moreover, the keycap is easily assembled or disassembled. Consequently, the keyboard device of the present invention can overcome the drawbacks of the conventional technologies.

The above objects and advantages of the present invention will become more readily apparent to those ordinarily skilled in the art after reviewing the following detailed description and accompanying drawings, in which:

DETAILED DESCRIPTION OF THE PREFERRED EMBODIMENT

Figure 1:
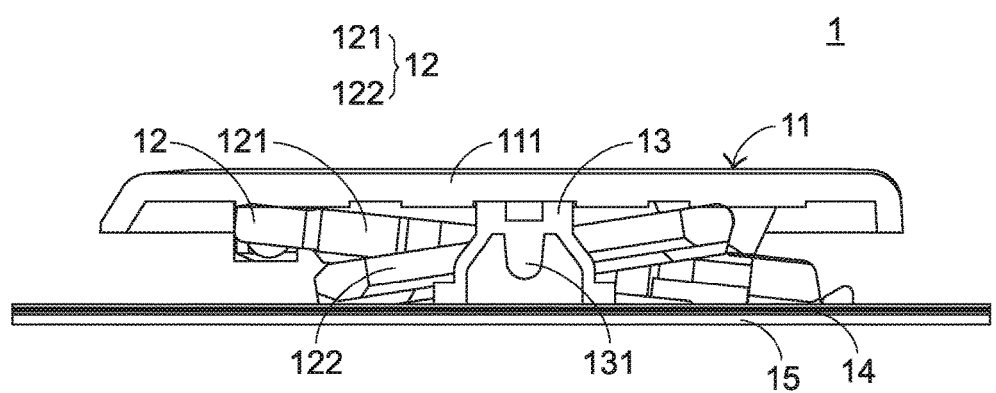
FIG. 1 is a schematic side view illustrating a conventional keyboard device.
Figure 2:
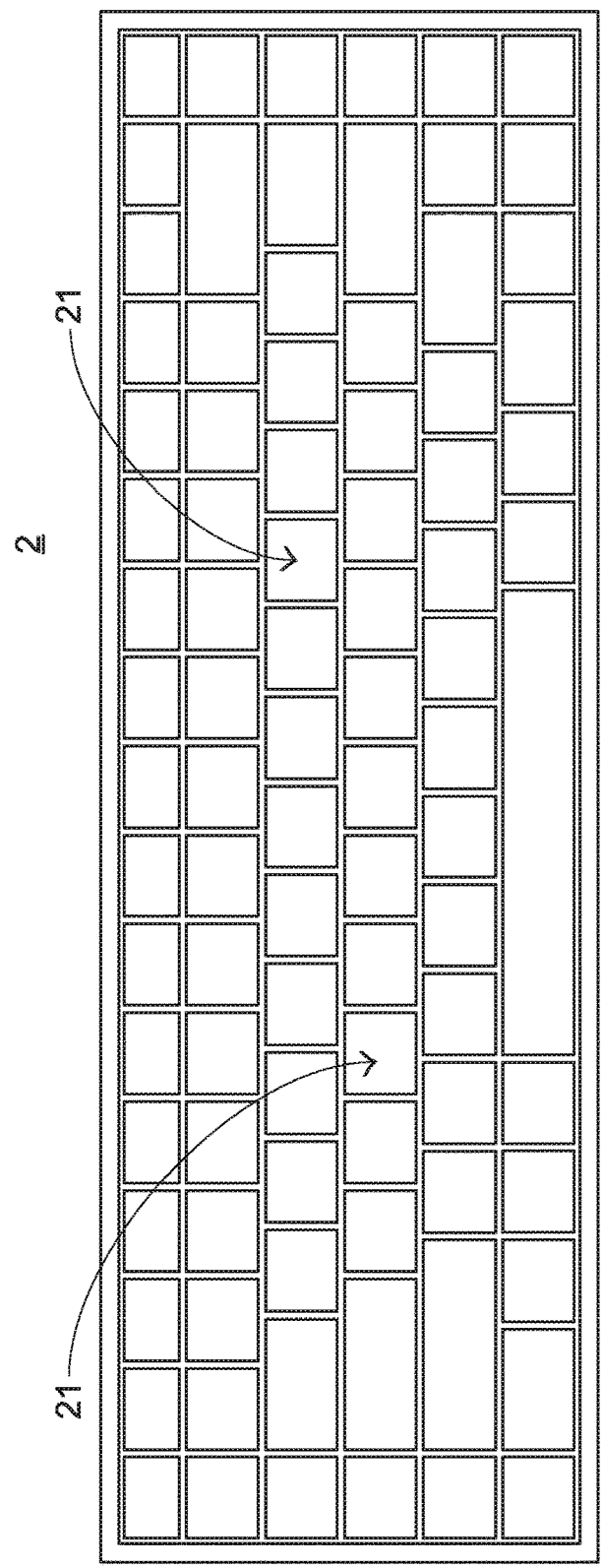
FIG. 2 is a schematic top view illustrating the outer appearance of a keyboard device according to a first embodiment of the present invention.
Figure 3:
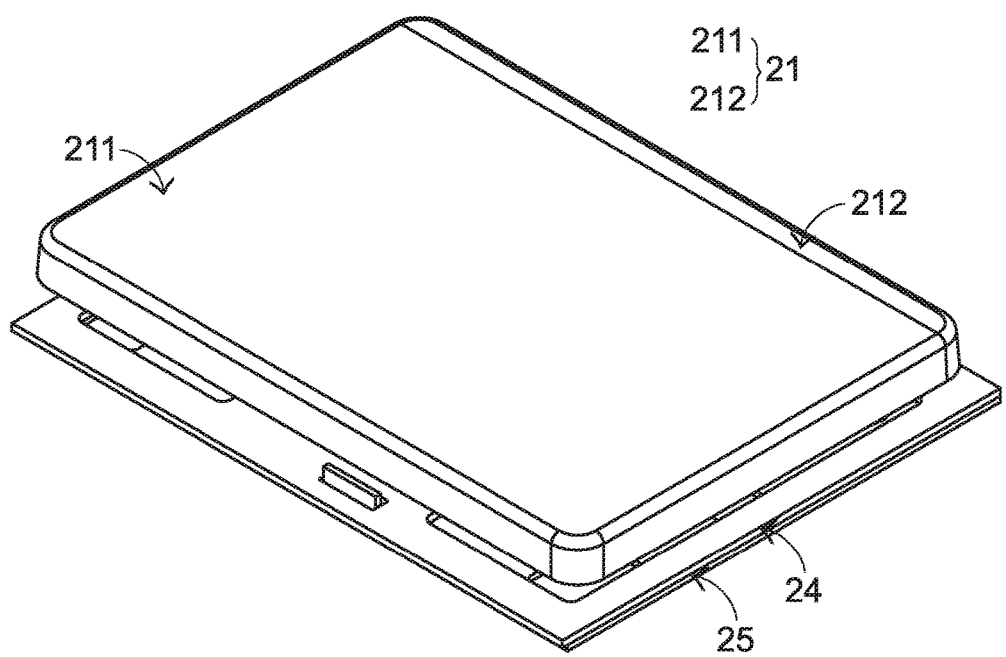
FIG. 3 is a schematic perspective view illustrating a portion of the keyboard device of FIG. 2.
Figure 4:
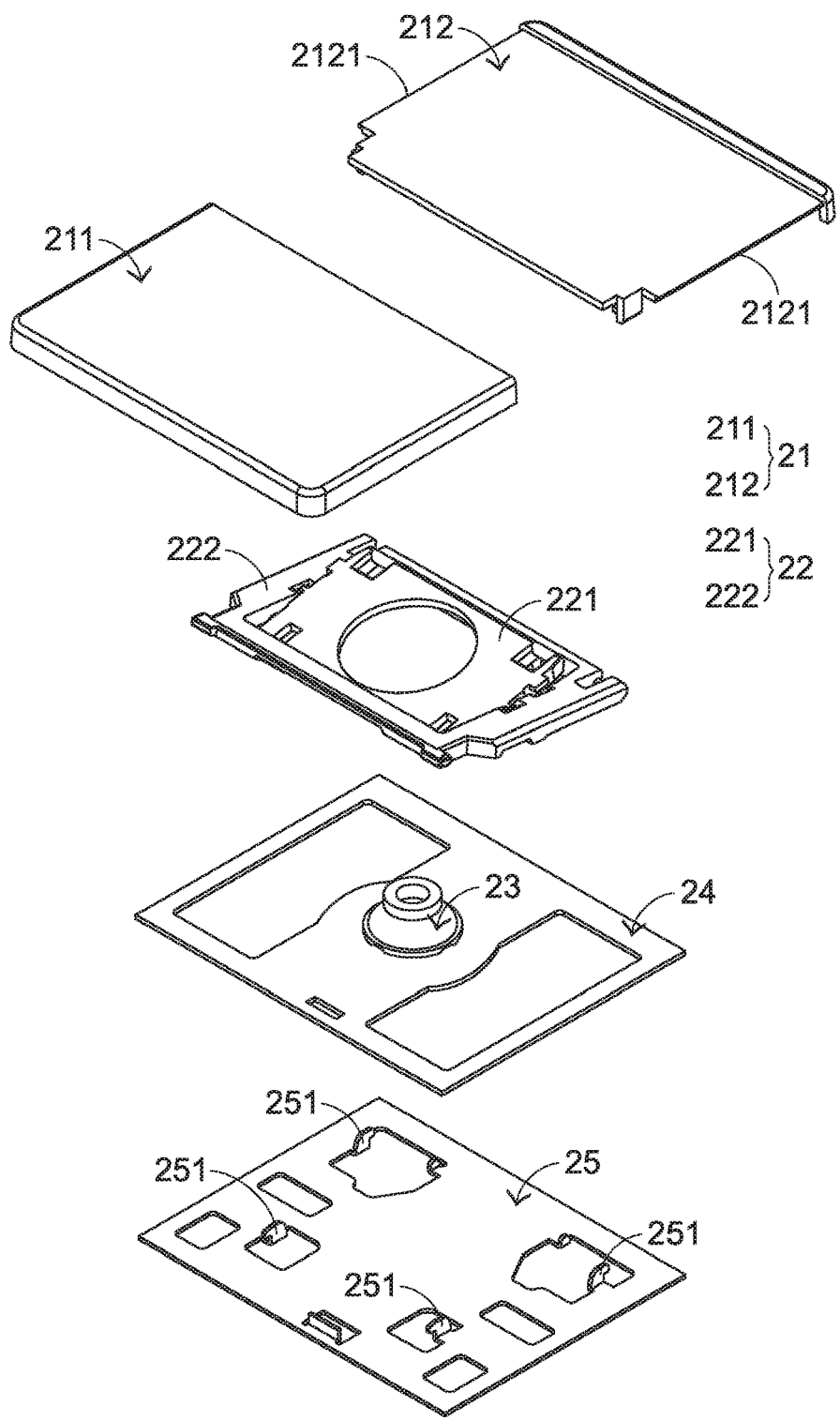
FIG. 4 is a schematic exploded view illustrating a portion of the keyboard device of FIG. 3 and taken along a viewpoint.
Figure 5:
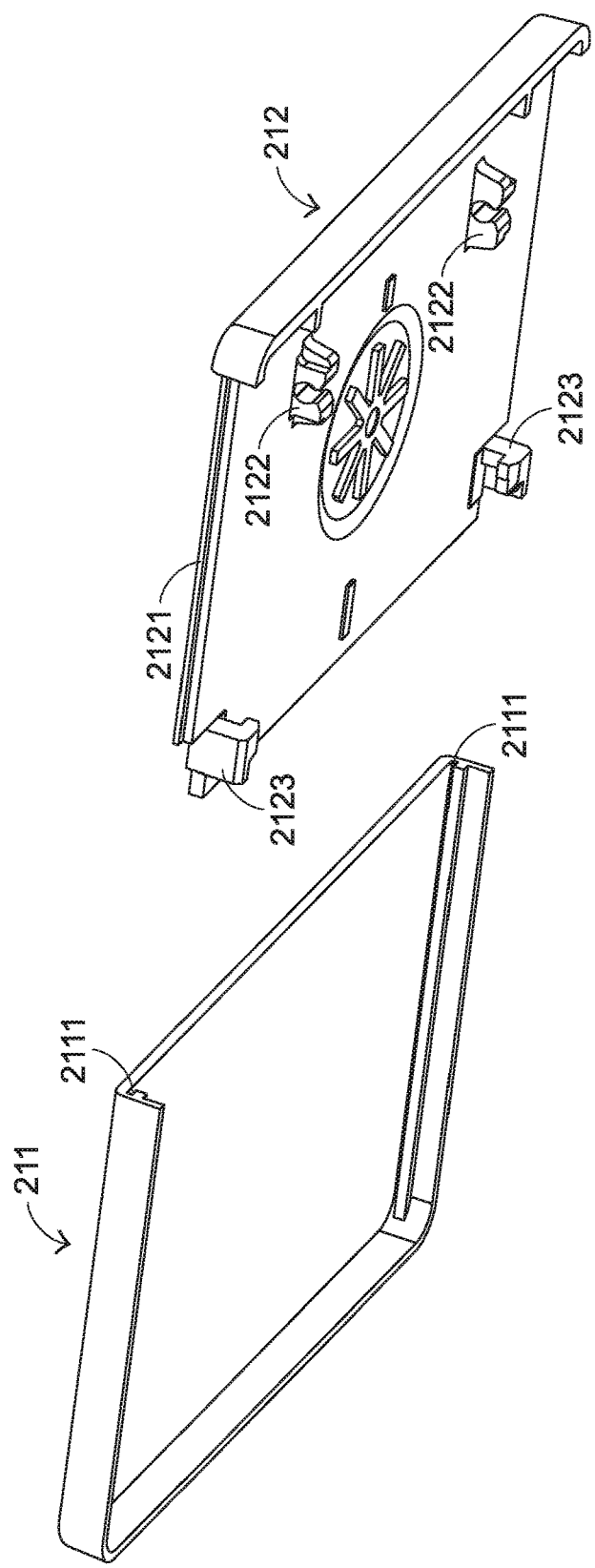
FIG. 5 is a schematic exploded view illustrating the replaceable keycap of the keyboard device of FIG. 3 and taken along another viewpoint.

Please refer to FIGS. 2, 3, 4 and 5. FIG. 2 is a schematic top view illustrating the outer appearance of a keyboard device according to a first embodiment of the present invention. FIG. 3 is a schematic perspective view illustrating a portion of the keyboard device of FIG. 2. FIG. 4 is a schematic exploded view illustrating a portion of the keyboard device of FIG. 3 and taken along a viewpoint. FIG. 5 is a schematic exploded view illustrating the replaceable keycap of the keyboard device of FIG. 3 and taken along another viewpoint. For succinctness, only one key and the related components are shown in FIGS. 3, 4 and 5. It is noted that the number of the keys 21 is not restricted. The keyboard device 2 comprises plural replaceable keys 21, a base plate 25, a membrane circuit board 24, a connecting element 22 and an elastic element 23. These replaceable keys 21 are classified into some types, e.g., ordinary keys, numeric keys and function keys. When one of the replaceable keys 21 is depressed by the user's finger, the keyboard device 2 generates a corresponding key signal to a computer (not shown). According to the key signal, the computer executes a corresponding function. For example, when an ordinary key is depressed, a corresponding English letter or symbol is inputted into the computer. When a numeric key is depressed, a corresponding number is inputted into the computer. In addition, the function keys (F1~F12) can be programmed to provide various quick access functions.

In an embodiment, each replaceable key 21 comprises a keycap 211 and a coupling plate 212. The keycap 211 is exposed outside the keyboard device 2. The coupling plate 212 comprises a first sliding part 2121. The keycap 211 comprises a second sliding part 2111. The second sliding part 2111 is slidable relative to the first sliding part 2121. Consequently, as the keycap 211 is slid relative to the coupling plate 212, the keycap 211 is combined with the coupling plate 212 and at least a portion of the coupling plate 212 is covered by the keycap 211. Alternatively, as the keycap 211 is slid relative to the coupling plate 212, the keycap 211 is detached from the coupling plate 212. The process of detaching the keycap 211 from the coupling plate 212 will be described later.

After the keycap 211 and the coupling plate 212 are combined together, the coupling plate 212 is synchronously moved with the keycap 211. The connecting element 22 is disposed on the base plate 25 and connected between the coupling plate 212 and the base plate 25. Through the connecting element 22, the coupling plate 212 is movable upwardly or downwardly relative to the base plate 25. The elastic element 23 is arranged between the coupling plate 212 and the membrane circuit board 24. Moreover, the elastic element 23 comprises a contacting part (not shown).

In an embodiment, the coupling plate 212 comprises fixed hooks 2122 and movable hooks 2123. The fixed hooks 2122 are disposed on a bottom surface of the coupling plate 212 and located at a first side of the coupling plate 212. The movable hooks 2123 are disposed on the bottom surface of the coupling plate 212 and located at a second side of the coupling plate 212.

In an embodiment, the connecting element 22 is a scissors-type connecting element. Moreover, the connecting element 22 comprises a first frame 221 and a second frame 222. The second frame 222 is pivotally coupled to the first frame 221. The first frame 221 is an inner frame, and the second frame 222 is an outer frame. The base plate 25 comprises plural base plate hooks 251. The plural base plate hooks 251 are protruded upwardly. A first end of the first frame 221 is connected with the fixed hooks 2122 of the coupling plate 212. A second end of the first frame 221 is connected with the corresponding base plate hooks 251 of the base plate 25. A first end of the second frame 222 is connected with the corresponding base plate hooks 251 of the base plate 25. A second end of the second frame 222 is connected with the movable hooks 2123 of the coupling plate 212. Due to the above structure, the first frame 221 and the second frame 222 can be swung relative to each other. Consequently, the first frame 221 and the second frame 222 are switched from a stacked state to an open-scissors state or switched from the open-scissors state to the stacked state. The connecting relationships between the connecting element 22, the base plate 25 and the coupling plate 212 are presented herein for purpose of illustration and description only.

Figure 6:
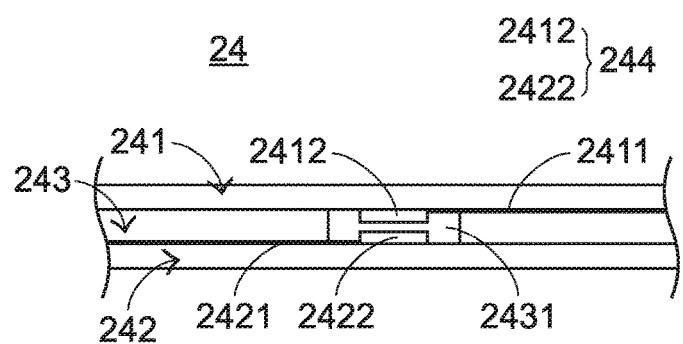
FIG. 6 is a schematic side view illustrating a portion of the membrane circuit board of the keyboard device as shown in FIG. 3.

The membrane circuit board 24 is arranged between the base plate 25 and the coupling plate 212. Moreover, the membrane circuit board 24 comprises plural film layers, which are arranged in a stack form. FIG. 6 is a schematic side view illustrating a portion of the membrane circuit board of the keyboard device as shown in FIG. 3. In this embodiment, the plural film layers of the membrane circuit board 24 comprise an upper film layer 241 and a lower film layer 242. A first circuit pattern 2411 is formed on a bottom surface of the upper film layer 241. The first circuit pattern 2411 comprises plural upper contacts 2412 corresponding to the plural replaceable keys 21. A second circuit pattern 2421 is formed on a top surface of the lower film layer 242. The second circuit pattern 2421 comprises plural lower contacts 2422 corresponding to the plural upper contacts 2412. Each of the upper contacts 2412 and the corresponding lower contact 2422 are separated from each other by a spacing distance. Moreover, each of the upper contacts 2412 and the corresponding lower contact 2422 are collectively defined as a key switch 244. Moreover, for maintaining the spacing distance between each upper contact 2412 and the corresponding lower contact 2422, the membrane circuit board 24 further comprises an intermediate film layer 243. The intermediate film layer 243 is arranged between the upper film layer 241 and the lower film layer 242. In addition, the intermediate film layer 243 comprises plural perforations 2431 corresponding to the plural upper contacts 2412 and the plural lower contacts 2422.

While the keycap 211 of any replaceable key 21 is depressed, the combination of the keycap 211 and the coupling plate 212 is moved downwardly relative to the base plate 25 to push the connecting element 22. Consequently, the connecting element 22 is correspondingly swung. As the connecting element 22 is swung, the first frame 221 and the second frame 222 of the connecting element 22 are switched from the open-scissors state to the stacked state. Moreover, as the coupling plate 212 is moved downwardly to compress the elastic element 23, the corresponding upper contact 2412 is pushed and triggered by the contacting part of the elastic element 23. Consequently, the corresponding upper contact 2412 is contacted with the corresponding lower contact 2422 through the corresponding perforation 2431. In such way, the corresponding key switch 244 is electrically conducted and triggered, and the keyboard device 2 generates a corresponding key signal. When the keycap 211 of the replaceable key 21 is no longer depressed, the coupling plate 212 is moved upwardly relative to the base plate 25 in response to an elastic force of the elastic element 23. Meanwhile, the first frame 221 and the second frame 222 are switched from the stacked state to the open-scissors state again. Since the keycap 211 is moved upwardly with the coupling plate 212, the keycap 211 is returned to its original position.

Figure 7:
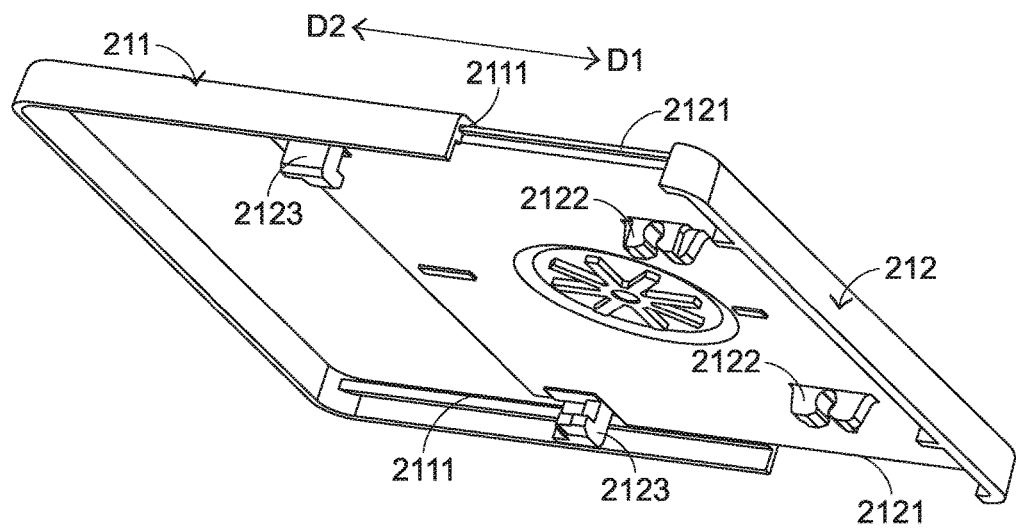
FIG. 7 schematically the structure of the replaceable key as shown in FIG. 5 during the process of assembling the keycap with the coupling plate or disassembling the keycap from the coupling plate.
Figure 8:
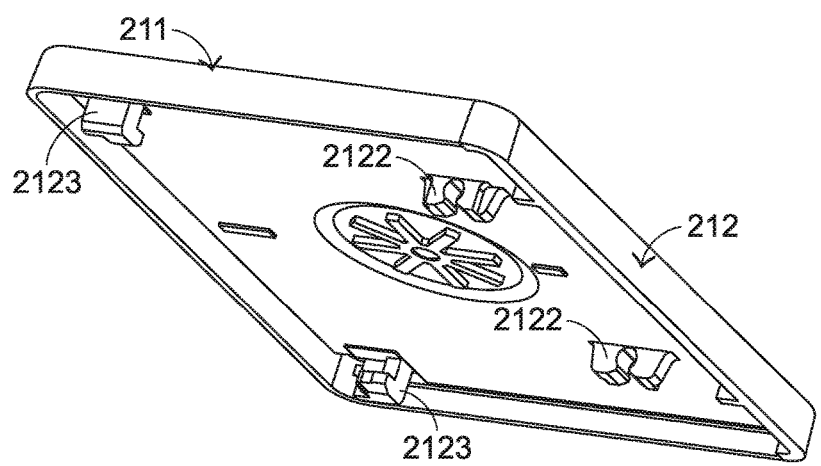
FIG. 8 schematically the assembled structure of the keycap and the coupling plate of the replaceable key as shown in FIG. 5.

The structure and operation of the replaceable key 21 of the keyboard device 2 will be described in more details as follows. Please refer to FIGS. 5, 7 and 8. FIG. 7 schematically the structure of the replaceable key as shown in FIG. 5 during the process of assembling the keycap with the coupling plate or disassembling the keycap from the coupling plate. FIG. 8 schematically the assembled structure of the keycap and the coupling plate of the replaceable key as shown in FIG. 5. In this embodiment, the second sliding part 2111 of the keycap 211 is a sliding groove, which is formed in an inner surface of a lateral edge of the keycap 211. Moreover, the first sliding part 2121 of the coupling plate 212 is a protrusion block, which is formed on a lateral edge of the coupling plate 212. The first sliding part 2121 of the coupling plate 212 (e.g., the protrusion block) is received within and movable relative to the second sliding part 2111 of the keycap 211 (e.g., the sliding groove). As shown in FIG. 5, the keycap 211 and the coupling plate 212 of the replaceable key 21 are separated from each other. For assembling the keycap 211 with the coupling plate 212, the following process is performed. Firstly, the second sliding part 2111 of the keycap 211 (e.g., the sliding groove) is aligned with the first sliding part 2121 of the coupling plate 212 (e.g., the protrusion block). Then, through the engagement between the second sliding part 2111 (e.g., the sliding groove) and the first sliding part 2121 (e.g., the protrusion block), the keycap 211 is moved in the direction D1 until the keycap 211 and the coupling plate 212 are combined together (see FIGS. 7 and 8). As shown in FIG. 8, the keycap 211 and the coupling plate 212 are assembled with each other. For disassembling the keycap 211 from the coupling plate 212 (i.e., separating the keycap 211 from the coupling plate 212), the keycap 211 is moved in the direction D2. Then, the second sliding part 2111 (e.g., the sliding groove) is disengaged from the first sliding part 2121 (e.g., the protrusion block) until the keycap 211 and the coupling plate 212 are separated from each other (see FIG. 5).

Figure 9:
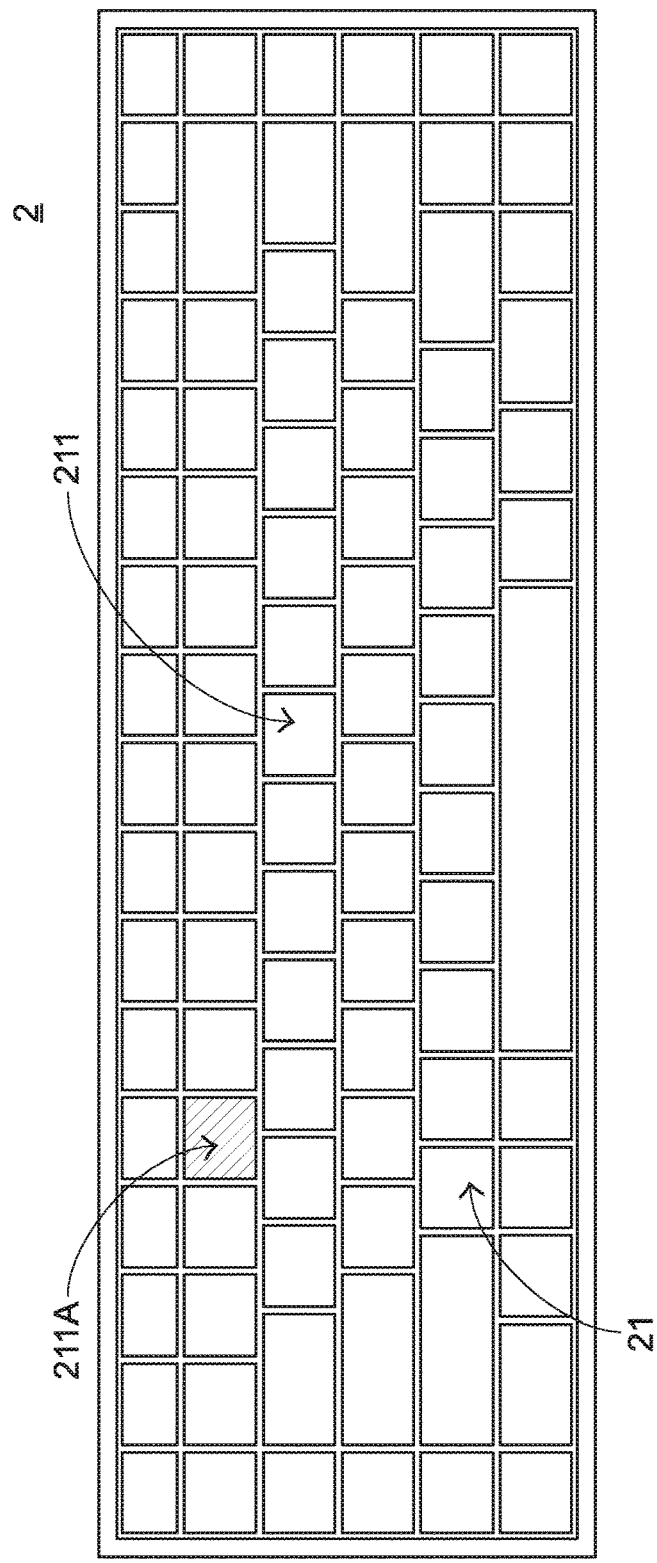
FIG. 9 is a schematic top view illustrating the outer appearance of the keyboard device as shown in FIG. 2, in which a keycap is changed.

From the above descriptions, the arrangements of the second sliding part 2111 and the first sliding part 2121 allow the keycap 211 to be easily assembled with the coupling plate 212 and easily disassembled from the coupling plate 212. If the user intends to change the keycap 211 to another keycap 211A (see FIG. 9), the keycap 211 is firstly disassembled from the coupling plate 212 through the relative movement between the second sliding part 2111 and the first sliding part 2121 and then the keycap 211A is assembled with the coupling plate 212. For example, the keycap 211 is made of a plastic material, and the keycap 211A is made of a leather material or a wood material. FIG. 9 is a schematic top view illustrating the outer appearance of the keyboard device as shown in FIG. 2, in which a keycap is changed. As previously described, the connecting element of the conventional keyboard device is connected with the keycap. According to the technology of the present invention, the connecting element 22 is connected with the coupling plate 212. Consequently, during the process of disassembling the keycap 211, the connecting element 22 is not touched. Since the connecting element 22 is not damaged, the drawback of the conventional technology can be overcome.

Figure 10:
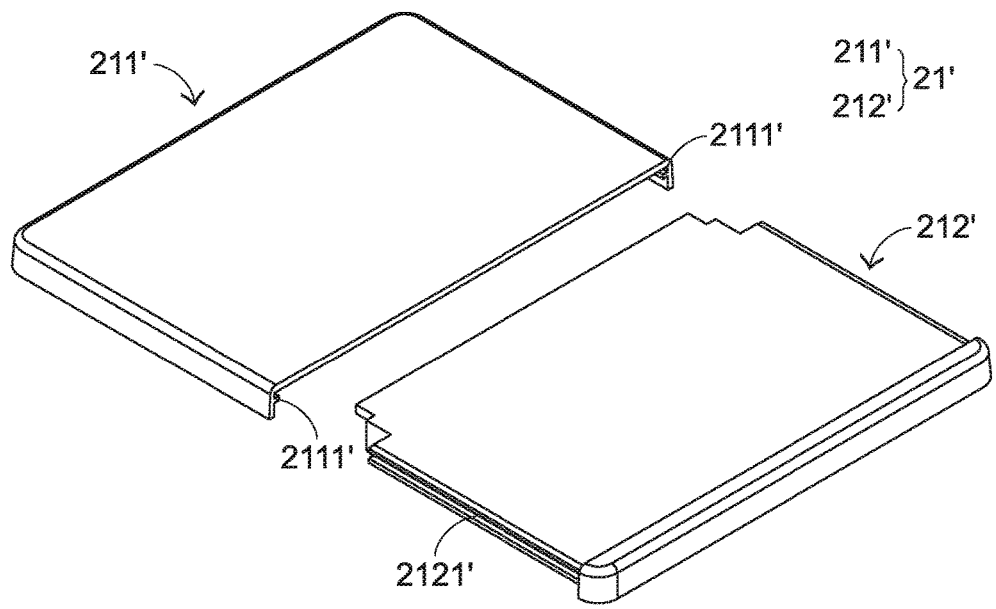
FIG. 10 is a schematic exploded view illustrating a replaceable keycap of a keyboard device according to a second embodiment of the present invention.
Figure 11:
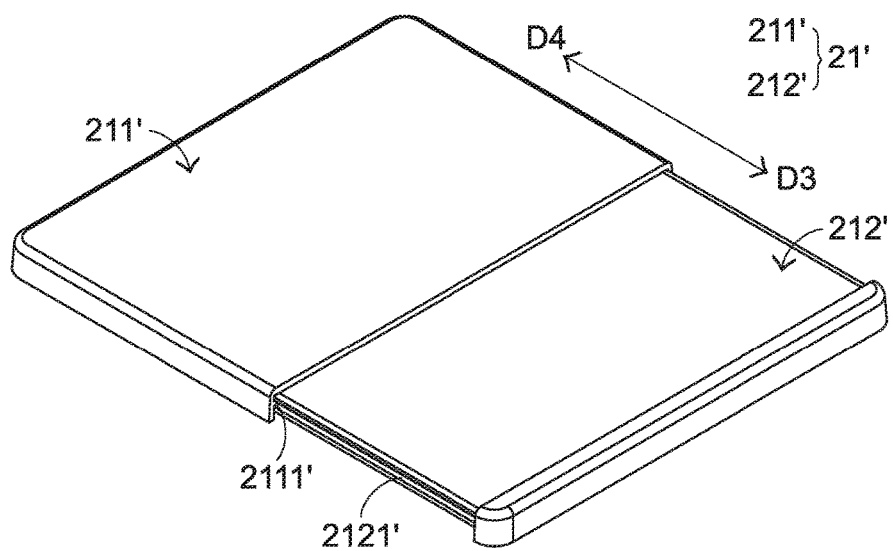
FIG. 11 schematically the structure of the replaceable key as shown in FIG. 10 during the process of assembling the keycap with the coupling plate or disassembling the keycap from the coupling plate.
Figure 12:
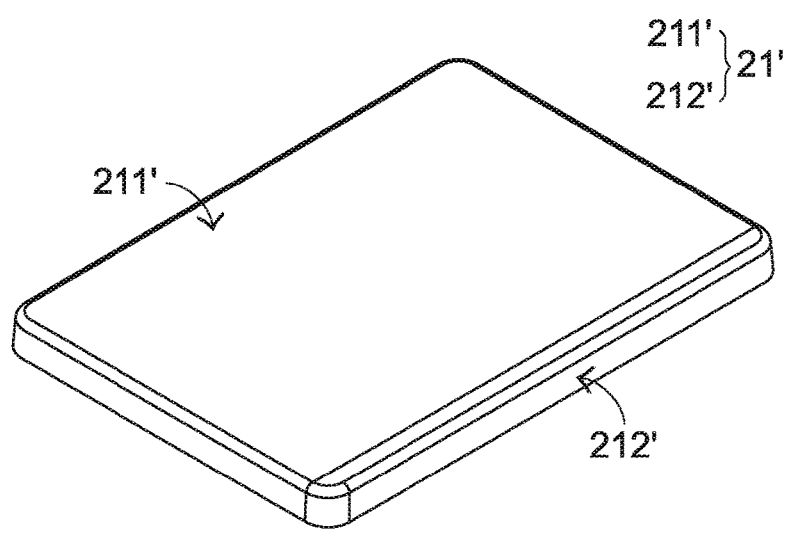
FIG. 12 schematically the assembled structure of the keycap and the coupling plate of the replaceable key as shown in FIG. 10.

The present invention further provides a second embodiment, which is distinguished from the first embodiment. FIG. 10 is a schematic exploded view illustrating a replaceable keycap of a keyboard device according to a second embodiment of the present invention. FIG. 11 schematically the structure of the replaceable key as shown in FIG. 10 during the process of assembling the keycap with the coupling plate or disassembling the keycap from the coupling plate. FIG. 12 schematically the assembled structure of the keycap and the coupling plate of the replaceable key as shown in FIG. 10. The components of the keyboard device of this embodiment which are identical to those of the first embodiment are not redundantly described herein. In comparison with the first embodiment, the structure of the replaceable key 21' of this embodiment is distinguished.

In this embodiment, the first sliding part 2121' of the coupling plate 212' is a sliding groove, which is formed in a lateral edge of the coupling plate 212'. Moreover, the second sliding part 2111' of the keycap 211' is a protrusion block, which is formed on an inner surface of a lateral edge of the keycap 211'. The second sliding part 2111' of the keycap 211' (e.g., the protrusion block) is received within and movable relative to the first sliding part 2121' of the coupling plate 212' (e.g., the sliding groove). As shown in FIG. 10, the keycap 211' and the coupling plate 212' of the replaceable key 21' are separated from each other. For assembling the keycap 211' with the coupling plate 212', the following process is performed. Firstly, the second sliding part 2111' of the keycap 211' (e.g., the protrusion block) is aligned with the first sliding part 2121' of the coupling plate 212' (e.g., the sliding groove). Then, through the engagement between the second sliding part 2111' (e.g., the protrusion block) and the first sliding part 2121' (e.g., the sliding groove), the keycap 211' is moved in the direction D3 until the keycap 211' and the coupling plate 212' are combined together (see FIGS. 11 and 12). As shown in FIG. 12, the keycap 211' and the coupling plate 212' are assembled with each other. For disassembling the keycap 211' from the coupling plate 212' (i.e., separating the keycap 211' from the coupling plate 212'), the keycap 211' is moved in the direction D4. Then, the second sliding part 2111' (e.g., the protrusion block) is disengaged from the first sliding part 2121' (e.g., the sliding groove) until the keycap 211' and the coupling plate 212' are separated from each other (see FIG. 10).

From the above descriptions, the arrangements of the second sliding part 2111' and the first sliding part 2121' allow the keycap 211' to be easily assembled with the coupling plate 212' and easily disassembled from the coupling plate 212'. If the user intends to change one keycap 211' (e.g., a plastic keycap) to another keycap (e.g., a leather keycap or a wood keycap), the plastic keycap 211' is firstly disassembled from the coupling plate 212' through the relative movement between the second sliding part 2111' and the first sliding part 2121' and then the leather keycap (or the wood keycap) is assembled with the coupling plate 212. As previously described, the connecting element of the conventional keyboard device is connected with the keycap. According to the technology of the present invention, the connecting element 22 is connected with the coupling plate 212'. Consequently, during the process of disassembling the keycap 211', the connecting element 22 is not contacted. Since the connecting element 22 is not damaged, the drawback of the conventional technology can be overcome.

It is noted that numerous modifications and alterations may be made while retaining the teachings of the invention. In the above embodiments, the key switch 244 of the keyboard device 2 is the membrane key switch. Alternatively, the key switch is a mechanical key switch. In the above embodiments, the base plate 25 of the keyboard device 2 is located under the membrane circuit board 24. Alternatively, the base plate is located above the membrane circuit board 24. In the above embodiments, the connecting element 22 is the scissors-type connecting element. Alternatively, the connecting element is any other appropriate type of connecting element.

While the invention has been described in terms of what is presently considered to be the most practical and preferred embodiments, it is to be understood that the invention needs not be limited to the disclosed embodiments. On the contrary, it is intended to cover various modifications and similar arrangements included within the spirit and scope of the appended claims which are to be accorded with the broadest interpretation so as to encompass all modifications and similar structures.

What is claimed is:

1. A keyboard device, comprising:
    a key switch;
    a base plate;
    a connecting element disposed on the base plate and connected with the base plate; and
    a replaceable key comprising:
        a coupling plate located over the connecting element and connected with the connecting element, and comprising a first sliding part, wherein when the coupling plate is moved downwardly relative to the base plate, the key switch is triggered; and
        a keycap exposed outside the keyboard device, and comprising a second sliding part, wherein the keycap is combined with the coupling plate and at least a portion of the coupling plate is covered by the keycap when the second sliding part is slid relative to the first sliding part, or the keycap is detached from the coupling plate when the second sliding part is slid relative to the first sliding part, wherein the first sliding part is a sliding groove, and the second sliding part is a protrusion block, wherein the protrusion block is inserted into the sliding groove and laterally slidable within the sliding groove.

2. The keyboard device according to claim 1, wherein the first sliding part is formed on a lateral edge of the coupling plate, and the second sliding part is formed on an inner surface of a lateral edge of the keycap.

3. The keyboard device according to claim 1, wherein the connecting element comprises:

a first frame, wherein a first end of the first frame is connected with the coupling plate, and a second end of the first frame is connected with the base plate; and
   a second frame connected with the first frame and swung relative to the first frame, wherein a first end of the second frame is connected with the base plate, and a second end of the second frame is connected with the coupling plate.

4. The keyboard device according to claim 3, wherein the coupling plate further comprises:
   a fixed hook disposed on a bottom surface of the coupling plate, and located at a first side of the coupling plate, wherein the fixed hook is connected with the first end of the first frame; and
   a movable hook disposed on the bottom surface of the coupling plate and located at a second side of the coupling plate, wherein the movable hook is connected with the second end of the second frame, so that the second end of the second frame is movable within the movable hook.

5. The keyboard device according to claim 3, wherein the base plate comprises plural base plate hooks, wherein a first one of the base plate hooks is connected with the second end of the first frame, and a second one of the base plate hooks is connected with the first end of the second frame.

6. The keyboard device according to claim 1, further comprising:
   a membrane circuit board arranged between the base plate and the coupling plate, and comprising a key switch; and
   an elastic element arranged between the coupling plate and the membrane circuit board, wherein while the keycap is depressed, the elastic element is compressed by the coupling plate and the key switch is pushed by the elastic element, wherein when the keycap is not depressed, the keycap is returned to an original position in response to an elastic force provided by the elastic element.

7. The keyboard device according to claim 6, wherein the membrane circuit board further comprises an upper film layer and a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each other by a spacing distance and collectively defined as the key switch.

8. The keyboard device according to claim 7, wherein the membrane circuit board further comprises an intermediate film layer between the upper film layer and the lower film layer, so that the upper contact and the lower contact are separated from each other by the spacing distance.

9. A keyboard device comprising:
    a key switch;
    a base plate;
    a connecting element disposed on the base plate and connected with the base plate; and
    a replaceable key comprising:
        a coupling plate located over the connecting element and connected with the connecting element, and comprising a first sliding part, wherein when the coupling plate is moved downwardly relative to the base plate, the key switch is triggered; and
        a keycap exposed outside the keyboard device, and comprising a second sliding part, wherein the keycap is combined with the coupling plate and at least a portion of the coupling plate is covered by the keycap when the second sliding part is slid relative to the first sliding part, or the keycap is detached from the coupling plate when the second sliding part is slid relative to the first sliding part, wherein the second sliding part is a sliding groove, and the first sliding part is a protrusion block, wherein the protrusion block is inserted into the sliding groove and laterally slidable within the sliding groove.

10. The keyboard device according to claim 9, wherein the first sliding part is formed on a lateral edge of the coupling plate, and the second sliding part is formed on an inner surface of a lateral edge of the keycap.

11. The keyboard device according to claim 9, wherein the connecting element comprises:
   a first frame, wherein a first end of the first frame is connected with the coupling plate, and a second end of the first frame is connected with the base plate; and
   a second frame connected with the first frame and swung relative to the first frame, wherein a first end of the second frame is connected with the base plate, and a second end of the second frame is connected with the coupling plate.

12. The keyboard device according to claim 11, wherein the coupling plate further comprises:
   a fixed hook disposed on a bottom surface of the coupling plate, and located at a first side of the coupling plate, wherein the fixed hook is connected with the first end of the first frame; and
   a movable hook disposed on the bottom surface of the coupling plate and located at a second side of the coupling plate, wherein the movable hook is connected with the second end of the second frame, so that the second end of the second frame is movable within the movable hook.

13. The keyboard device according to claim 11, wherein the base plate comprises plural base plate hooks, wherein a first one of the base plate hooks is connected with the second end of the first frame, and a second one of the base plate hooks is connected with the first end of the second frame.

14. The keyboard device according to claim 9, further comprising:
   a membrane circuit board arranged between the base plate and the coupling plate, and comprising a key switch; and
   an elastic element arranged between the coupling plate and the membrane circuit board, wherein while the keycap is depressed, the elastic element is compressed by the coupling plate and the key switch is pushed by the elastic element, wherein when the keycap is not depressed, the keycap is returned to an original position in response to an elastic force provided by the elastic element.

15. The keyboard device according to claim 14, wherein the membrane circuit board further comprises an upper film layer and a lower film layer, wherein a first circuit pattern is formed on the upper film layer, a second circuit pattern is formed on the lower film layer, the first circuit pattern comprises an upper contact, and the second circuit pattern comprises a lower contact, wherein the upper contact and the lower contact are separated from each other by a spacing distance and collectively defined as the key switch.

16. The keyboard device according to claim 15, wherein the membrane circuit board further comprises an intermediate film layer between the upper film layer and the lower film layer, so that the upper contact and the lower contact are separated from each other by the spacing distance.

* * * * *